United States Patent
Lin et al.

(10) Patent No.: US 7,740,379 B2
(45) Date of Patent: Jun. 22, 2010

(54) ILLUMINATION MODULE AND PROJECTION APPARATUS

(75) Inventors: Tai-Wei Lin, Hsinchu (TW); Chi-Chui Yun, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 120 days.

(21) Appl. No.: 11/840,663

(22) Filed: Aug. 17, 2007

(65) Prior Publication Data

US 2008/0232100 A1 Sep. 25, 2008

(30) Foreign Application Priority Data

Mar. 22, 2007 (TW) ................................ 096109878

(51) Int. Cl.
*F21V 29/00* (2006.01)
(52) U.S. Cl. ...................... 362/294; 362/231; 362/240; 362/368; 362/373; 362/800
(58) Field of Classification Search ................ 362/231, 362/240, 294, 368, 373, 800; 165/58, 138, 165/DIG. 228
See application file for complete search history.

(56) References Cited

U.S. PATENT DOCUMENTS

2005/0020360 A1 * 1/2005 Hosaka ......................... 463/31
2005/0254013 A1 * 11/2005 Engle et al. .................... 353/52
2007/0285920 A1 * 12/2007 Seabrook ..................... 362/240

FOREIGN PATENT DOCUMENTS

| TW | M292037 | 6/2006 |
| TW | M292043 | 6/2006 |
| TW | I263008 | 10/2006 |

* cited by examiner

*Primary Examiner*—Sandra L O'Shea
*Assistant Examiner*—Meghan K Dunwiddie
(74) *Attorney, Agent, or Firm*—J.C. Patents

(57) ABSTRACT

An illumination module including a first light-emitting element, a first heat dissipation element, a first heat conducting unit, a second light-emitting element, a second heat dissipation element, and a second heat conducting unit is provided. The first light-emitting element is capable of emitting a first color light beam. The first heat conducting unit is connected between the first light-emitting element and the first heat dissipation element. The second light-emitting element is capable of emitting a second color light beam. The second heat conducting unit is connected between the second light-emitting element and the second heat dissipation element. The first heat dissipation element and the second heat dissipation element are disposed separately. The first heat conducting unit and the second heat conducting unit are also disposed separately. The heat dissipation characteristic of the illumination module is better. A projection apparatus having the illumination module is also provided.

20 Claims, 10 Drawing Sheets

ILLUMINATION MODULE AND PROJECTION APPARATUS

CROSS-REFERENCE TO RELATED APPLICATION

This application claims the priority benefit of Taiwan application serial no. 96109878, filed on Mar. 22, 2007. All disclosure of the Taiwan application is incorporated herein by reference.

BACKGROUND OF THE INVENTION

1. Field of the Invention

The present invention relates to an illumination module, and particularly to an illumination module with good heat dissipation characteristic.

2. Description of Related Art

Light-emitting diodes (LED), having advantages of long lifespan, small volume, power saving, low pollution, high reliability, and mass production, etc. are used as a light source in illumination modules. However, LEDs are sensitive to temperature. When the temperature is too high, the light-emitting efficiency of LEDs deteriorates, and the wavelength of the light beams emitted by LEDs shifts (i.e. the color of the light beams shifts). Accordingly, the illumination module using LEDs must have a good heat dissipation design to conduct the heat generated by LEDs when emitting lights, so as to keep LEDs working at a lower temperature to maintain an optical quality of the light beams emitted by LEDs.

Referring to FIG. 1, a conventional LED illumination module 100 includes a plurality of red LEDs 110$a$, a plurality of green LEDs 110$b$, a plurality of blue LEDs 110$c$, a heat conducting block 120, a plurality of heat pipes 130, and a heat dissipation element 140. The red LEDs 110$a$, the green LEDs 110$b$, and the blue LEDs 110$c$ are disposed on a surface of the heat conducting block 120. The heat pipe 130 is connected between the heat conducting block 120 and the heat dissipation element 140, and the heat generated by the red LED 110$a$, the green LED 110$b$, and the blue LED 110$c$ when emitting light beams is dissipated through the same heat conducting block 120, the heat pipe 130, and the heat dissipation element 140 sequentially. The heat dissipation element 140 has a plurality of heat sinks 142, so that the heat dissipation element 140 has a larger heat dissipation area.

Generally speaking, as the red LED 110$a$ is more sensitive to temperature as compared with the green LED 110$b$ and the blue LED 110$c$, a conductivity of the heat generated by the red LED 110$a$ must be high enough to avoid the deterioration of the light-emitting efficiency and the shift of the color of the emitted light beam resulting from over-high temperature. However, in the conventional LED illumination module 100, as the heat generated by the red LED 110$a$, the green LED 110$b$, and the blue LED 110$c$ is dissipated to the environment through the same heat dissipation element 140, the heat generated by the LEDs of three colors influences one another, which makes the heat conductivities being identical, thus leading to the difficulty in improvement of the conductivity of the heat generated by the red LED 110$a$. In this manner, although the heat conductivity is sufficient to maintain the blue LED 110$c$ and the green LED 110$b$ working at a normal working temperature, for the red LED 110$a$, the thermal conductivity is insufficient, thus leading to the problems of the deterioration of the light-emitting efficiency and the shift of the color of the red LED 110$a$.

SUMMARY OF THE INVENTION

Accordingly, the present invention is directed to providing an illumination module having a good heat dissipation characteristic and a reduced overall volume and also providing a projection apparatus having the illumination module.

Other objectives, features and advantages of the present invention will be further understood from the further technology features disclosed by the present invention wherein there is shown and described a preferred embodiment of this invention, simply by way of illustration of one of the modes best suited to carry out the invention.

As embodied and broadly described herein, an illumination module provided by the present invention includes a first light-emitting element, a first heat dissipation element, a first heat conducting unit, a second light-emitting element, a second heat dissipation element, and a second heat conducting unit. The first light-emitting element is capable of emitting a first color light beam. The first heat conducting unit is connected between the first light-emitting element and the first heat dissipation element. The second light-emitting element is capable of emitting a second color light beam. The second heat conducting unit is connected between the second light-emitting element and the second heat dissipation element. The first heat dissipation element and the second heat dissipation element are disposed separately, and the first heat conducting unit and the second heat conducting unit are disposed separately.

A projection apparatus provided the present invention includes the above illumination module, a light valve, and a projection lens. The illumination module is capable of providing an illumination beam. The light valve is disposed on a transmission path of the illumination beam, and is capable of converting the illumination beam into an image beam. The projection lens is disposed on a transmission path of the image beam.

Based on the above, in the illumination module of the present invention, the first light-emitting element and other light-emitting elements are connected to different heat dissipation elements disposed separately through the heat conducting unit, and the air flow passes through the heat dissipation elements sequentially. In this way, the first light-emitting element is, for example, designed to be a light-emitting element sensitive to temperature, which is connected to the first heat dissipation element disposed at an upstream of the air flow through the heat conducting unit. Other light-emitting elements is, for example, designed to be light-emitting elements less sensitive to temperature, which is connected to the heat dissipation element disposed at a downstream through the heat conducting unit. Thus, in the illumination module of the present invention, the heat generated by the light-emitting element which is sensitive to temperature is dissipated rapidly, so the luminous efficiency and color of all the light-emitting elements are controlled within a normal range. Therefore, the illumination module of the present invention provides a light source with good quality, and further improves a display quality of the projection apparatus using the illumination module.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
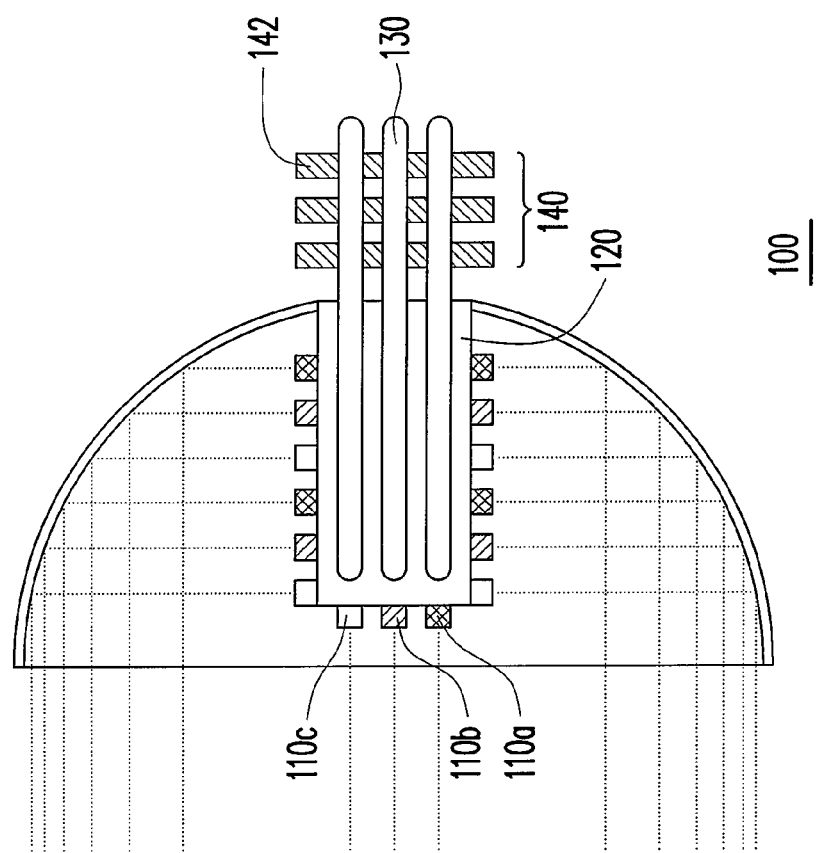
FIG. 1 is a schematic cross-sectional view of a conventional LED illumination module.
Figure 2A:
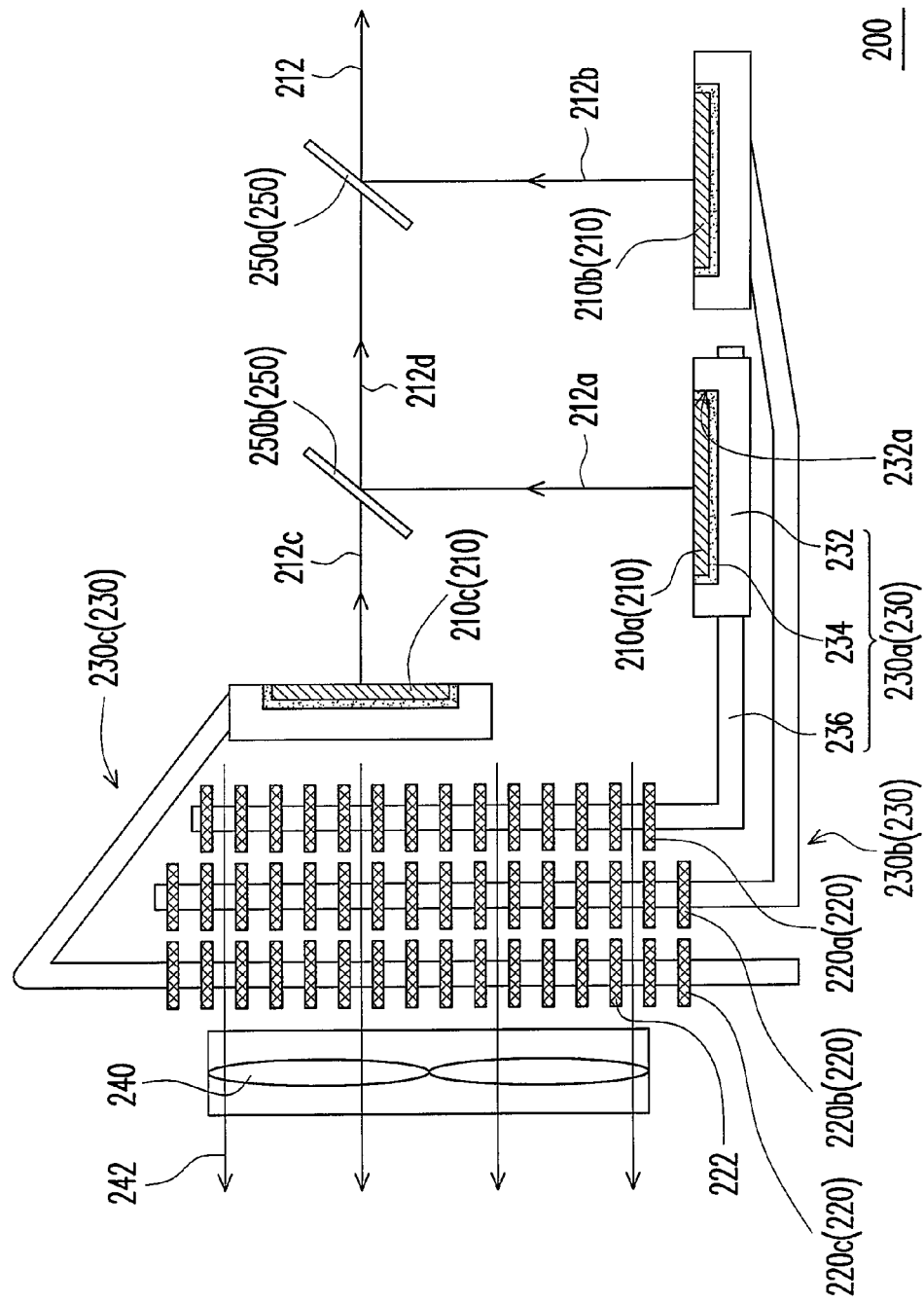
FIG. 2A is a schematic structural view of an illumination module according to an embodiment of the present invention.

Referring to FIG. 2A, an illumination module 200 of this embodiment includes a first light-emitting element 210a, a first heat dissipation element 220a, a first heat conducting unit 230a, a second light-emitting element 210b, a second heat dissipation element 220b, a second heat conducting unit 230b, and a fan 240. The first light-emitting element 210a is capable of emitting a first color light beam 212a. The first heat conducting unit 230a is connected between the first light-emitting element 210a and the first heat dissipation element 220a. The second light-emitting element 210b is capable of emitting a second color light beam 212b. The second heat conducting unit 230b is connected between the second light-emitting element 210b and the second heat dissipation element 220b. The first heat dissipation element 220a and the second heat dissipation element 220b are disposed separately, and the first heat conducting unit 230a and second heat conducting unit 230b are disposed separately. The fan 240 is capable of generating an air flow 242, and the air flow 242 passes through the first heat dissipation element 220a and the second heat dissipation element 220b sequentially.

In this embodiment, the illumination module 200 further includes a third light-emitting element 210c, a third heat dissipation element 220c, and a third heat conducting unit 230c. The third light-emitting element 210c is capable of emitting a third color light beam 212c. The third heat conducting unit 230c is connected between the third light-emitting element 210c and the third heat dissipation element 220c. The first heat dissipation element 220a, the second heat dissipation element 220b, and the third heat dissipation element 220c are disposed separately, and the first heat conducting unit 230a, the second heat conducting unit 230b, and the third heat conducting unit 230c are disposed separately. Additionally, the air flow 242 passes through the first heat dissipation element 220a, the second heat dissipation element 220b, and the third heat dissipation element 220c sequentially.

Figure 2B:
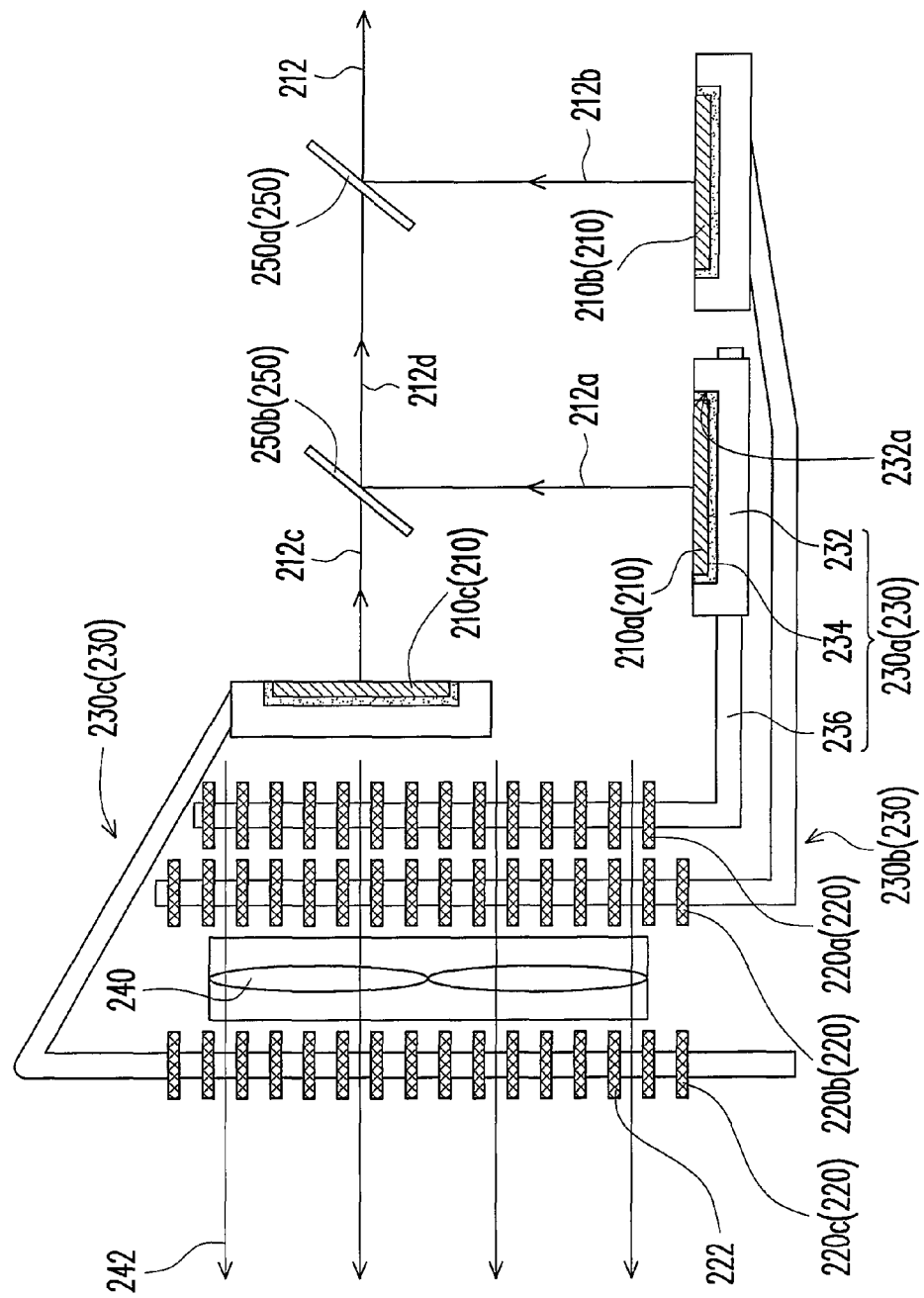
FIGS. 2B to 2D show other arrangement positions of the fan in FIG. 2A.
Figure 2C:
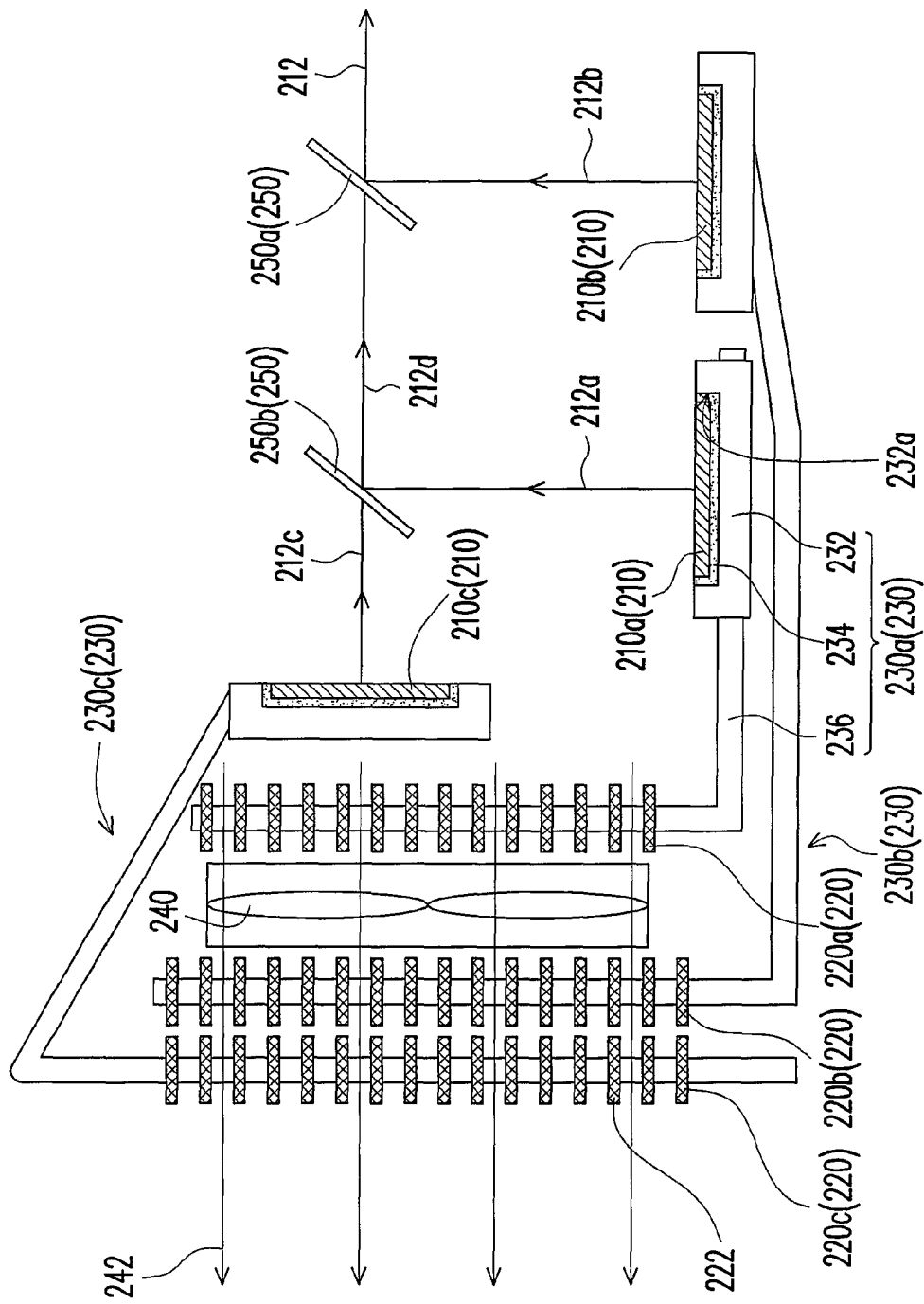
Figure 2D:
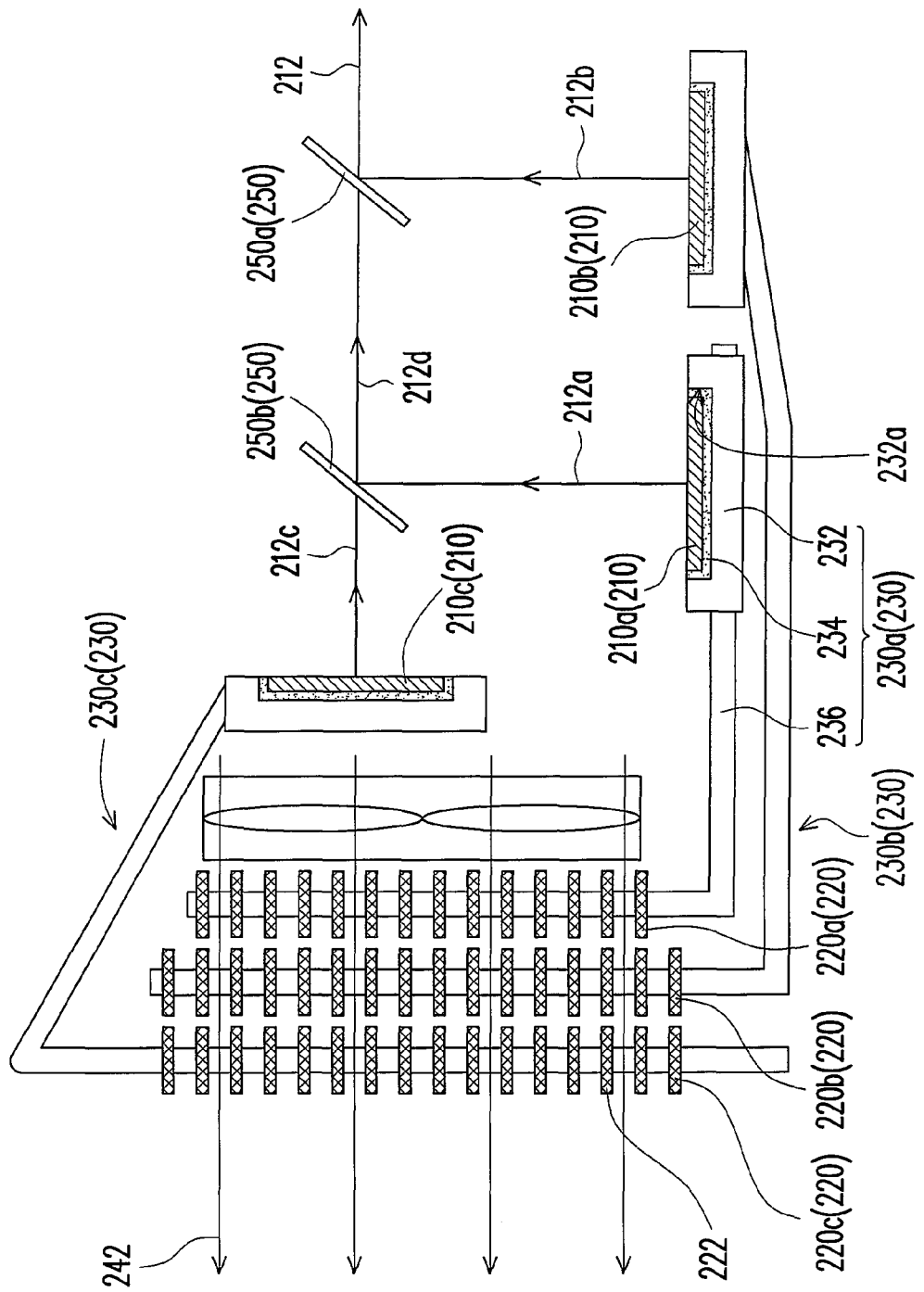

In this embodiment, the third heat dissipation element 220c is disposed between the fan 240 and the second heat dissipation element 220b. However, in other embodiments, the fan 240 is disposed between the third heat dissipation element 220c and the second heat dissipation element 220b (as shown in FIG. 2B). Or, the fan 240 is disposed between the second heat dissipation element 220b and the first heat dissipation element 220a (as shown in FIG. 2C). Or, the first heat dissipation element 220a is disposed between the second heat dissipation element 220b and the fan 240 (as shown in FIG. 2D).

Figure 3:
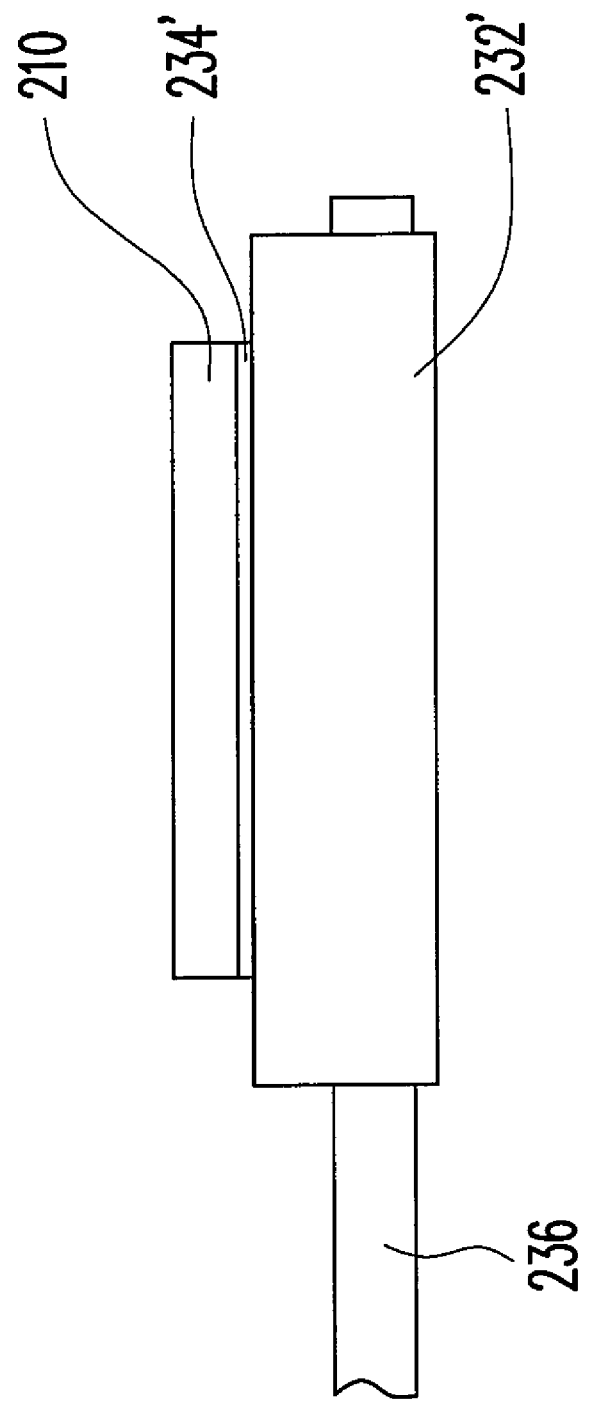
FIG. 3 shows a heat conducting block according to another embodiment of the present invention.

Each heat dissipation element 220 has a plurality of heat sinks 222 to increase the heat dissipation area of the heat dissipation element 220. Additionally, each heat conducting unit 230 includes a heat conducting block 232, a thermal adhesive 234, and a heat pipe 236. The thermal adhesive 234 is connected between the light-emitting element 210 and the heat conducting block 232 corresponding to the thermal adhesive 234, and the two ends of the heat pipe 236 are respectively connected to the heat dissipation element 220 and the heat conducting block 232 corresponding to the heat pipe 236. Moreover, each light-emitting element 210 is, for example, a light-emitting diode (LED). Additionally, each heat conducting block 232 has an accommodation recess 232a to accommodate the light-emitting element 210 corresponding to the heat conducting block 232. In this way, the contact area between the light-emitting element 210 and the heat conducting block 232 is increased, so that the heat generated by the light-emitting element 210 is rapidly conducted to the heat conducting block 232. However, in another embodiment, referring to FIG. 3, a heat conducting block 232' does not have accommodation recess, and the light-emitting element 210 is directly attached to the surface of the heat conducting block 232' through a thermal adhesive 234'.

Referring to FIG. 2A again, the illumination module 200 further includes at least one dichroic mirror 250 disposed on a transmission path of multiple color light beams emitted by at least a part of the light-emitting element 210, so as to mix at least a part of the color lights. For example, a dichroic mirror 250a is disposed on the transmission path of the first color light beam 212a and the second color light beam 212b to mix the first color light beam 212a and the second color light beam 212b. In addition, a dichroic mirror 250b is disposed on the transmission path of the first color light beam 212a and the third color light beam 212c to mix the first color light beam 212a and the third color light beam 212c. In particular, the first color light beam 212a and the third color light beam 212c are mixed into a fourth color light beam 212d by the dichroic mirror 250b. The fourth color light beam 212d is transferred to the dichroic mirror 250a, and then is mixed with the second color light beam 212b into an illumination beam 212.

In the illumination module 200 of this embodiment, the first light-emitting element 210a and other light-emitting elements 210b and 210c are connected to different heat dissipation elements 220 disposed separately through the heat conducting unit 230, and the air flow 242 passes through the heat dissipation elements 220 sequentially. In this way, the first light-emitting element 210a is designed to be a light-emitting element 210 sensitive to temperature, which is connected to the first heat dissipation element 220a disposed at the upstream of the air flow 242 through the heat conducting unit 230a. Other light-emitting elements 210b and 210c are designed to be a light-emitting element 210 less sensitive to temperature, which is connected to the heat dissipation elements 220b and 220c disposed at the downstream through the heat conducting units 230b and 230c.

As the air flow 242 at the upstream does not pass through any heat dissipation element 220 previously, the temperature of the air flow 242 at the upstream is lower than that of the air flow at the downstream, so that the heat generated by the first light-emitting element 210a (the light-emitting element 210 sensitive to temperature) is rapidly dissipated by the first heat dissipation element 220a disposed at the upstream. In this way, the first light-emitting element 210a (the light-emitting element 210 sensitive to temperature) works at a lower temperature, so that the luminous efficiency and color of all the light-emitting elements 210 is controlled within the normal range, thus the illumination module 200 of the present invention provides an illumination source with good quality.

Since the red LED is extremely sensitive to temperature, if the ambient temperature slightly rises, the optical efficiency becomes worse. Additionally, the red diode has a small wattage and strict specification, so in this embodiment, the first light-emitting element 210a that is easily heat-dissipated is designed to be a red LED, and the first color light beam 212a emitted by the light-emitting element 210a is, for example, a red light beam. Additionally, compared with the first light-emitting element 210a, the second light-emitting element 210b and the third light-emitting element 210c that cannot be easily heat-dissipated are designed to be a green LED and a blue LED or a blue LED and a green LED which are less sensitive to temperature, respectively.

Experimental data of the illumination module 200 when the first light-emitting element 210a, the second light-emitting element 210b, and the third light-emitting element 210c are a red LED, a green LED, and a blue LED respectively are listed in Table 1.

TABLE 1

| | Conditions | | | | | | | | |
|---|---|---|---|---|---|---|---|---|---|
| | Red ($T_j < 80°$ C.) Power Consumption = 30 W | | | Green ($T_j < 125°$ C.) Power Consumption = 83 W | | | Blue ($T_j < 100°$ C.) Power Consumption = 40 W | | |
| Voltage of | | $T_j$ | | | $T_j$ | | | $T_j$ | |
| Fan | $T_b$ | @25° C. | @45° C. | $T_b$ | @25° C. | @45° C. | $T_b$ | @25° C. | @45° C. |
| 6 V | 32.3 | 52.49 | 72.49 | 44.1 | 99.959 | 119.96 | 42.2 | 69.12 | 89.12 |
| 7 V | 31.8 | 51.99 | 71.99 | 43.4 | 99.259 | 119.26 | 40.1 | 67.02 | 87.02 |
| 8 V | 31.5 | 51.69 | 71.69 | 42.8 | 98.659 | 118.66 | 38.8 | 65.72 | 85.72 |
| 9 V | 31.2 | 51.39 | 71.39 | 42.4 | 98.259 | 118.26 | 38.3 | 65.22 | 85.22 |
| 10 V | 31.1 | 51.29 | 71.29 | 42.2 | 98.059 | 118.06 | 37.5 | 64.42 | 84.42 |

In Table 1, $T_j$ stands for the temperature of a PN junction of the LED, $T_b$ stands for the temperature of a package bottom of the LED, the data below @25° C. are experimental values obtained when the ambient temperature around the LED $T_j$ is 25° C., and the data below @45° C. are prediction values obtained when the ambient temperature around the LED $T_j$ is 45° C. It can be verified from the data in Table 1 that under the architecture of the illumination module 200 of this embodiment, the heat generated by the red LED sensitive to temperature is conducted out rapidly, and thus the temperature of the red LED is low. Additionally, since the green LED is more sensitive to temperature compared with the blue LED, the LEDs are kept working at an optimal working temperature by the air flow 242 passing through the first heat dissipation element 220a coupled to the red LED, the second heat dissipation element 220b coupled to the green LED, and the third heat dissipation element 220c coupled to the blue LED.

TABLE 2

| Conditions | Heat Conducting Block without Accommodation Recess | Heat Conducting with Block Accommodation Recess | Decrement of Temperature |
|---|---|---|---|
| $T_b$ | 53° C. | 50° C. | 3° C. |

In Table 2, the $T_b$ value of the heat conducting block without accommodation recess and the $T_b$ value of the heat conducting block with accommodation recess 232a are listed. It can be verified from Table 2, that when the heat conducting block has the accommodation recess 232a, the heat generated by the LED is conducted out rapidly, such that the temperature of the LED is low. Those skilled in the art can adopt the heat conducting block 232 with the accommodation recess 232a or the heat conducting block 232' without accommodation recess depending on the cost and the specification requirements (Referring to FIG. 3).

Additionally, it is known from the above experimental data that only one fan 240 is enough for the illumination module 200 of this embodiment to achieve good heat dissipation effect, and thus the structure of the illumination module 200 is simplified. In this manner, the overall volume of the illumination module 200 is reduced and the assembly procedure of the illumination module 200 is simplified, thus the illumination module 200 has high mass productivity.

It is should be noted that in the present invention, the number of the heat pipes 236 connected between an heat conducting block 232 and a heat dissipation element 220 is not limited to one. In order to improve the heat conductivity, in the present invention, a plurality of heat pipes 236 are connected between a heat conducting block 232 and a heat dissipation element 220. Additionally, the number of the light-emitting elements 210 of the same type (for example, all of the light-emitting elements 210 are first light-emitting elements 210a, second light-emitting elements 210b, or third light-emitting elements 210c) disposed on a heat conducting block 232 is not limited to one in the present invention.

Furthermore, if the light-emitting element 210, the heat conducting unit 230, and the heat dissipation element 220 which are connected together are considered to be one light-emitting assembly, the number of the light-emitting assemblies of the present invention is more than two, and the light-emitting assemblies are disposed separately. For example, the number of the light-emitting assemblies of the present invention is also two, and each light-emitting assembly has a light-emitting element 210, a heat conducting unit 230, and a heat dissipation element 220. Moreover, in the present invention, the number of the light-emitting elements 210, the heat conducting units 230, and the heat dissipation elements 220 in the same light-emitting assembly are not particularly limited, and the number is one or more, and the details will be described below.

Figure 4A:
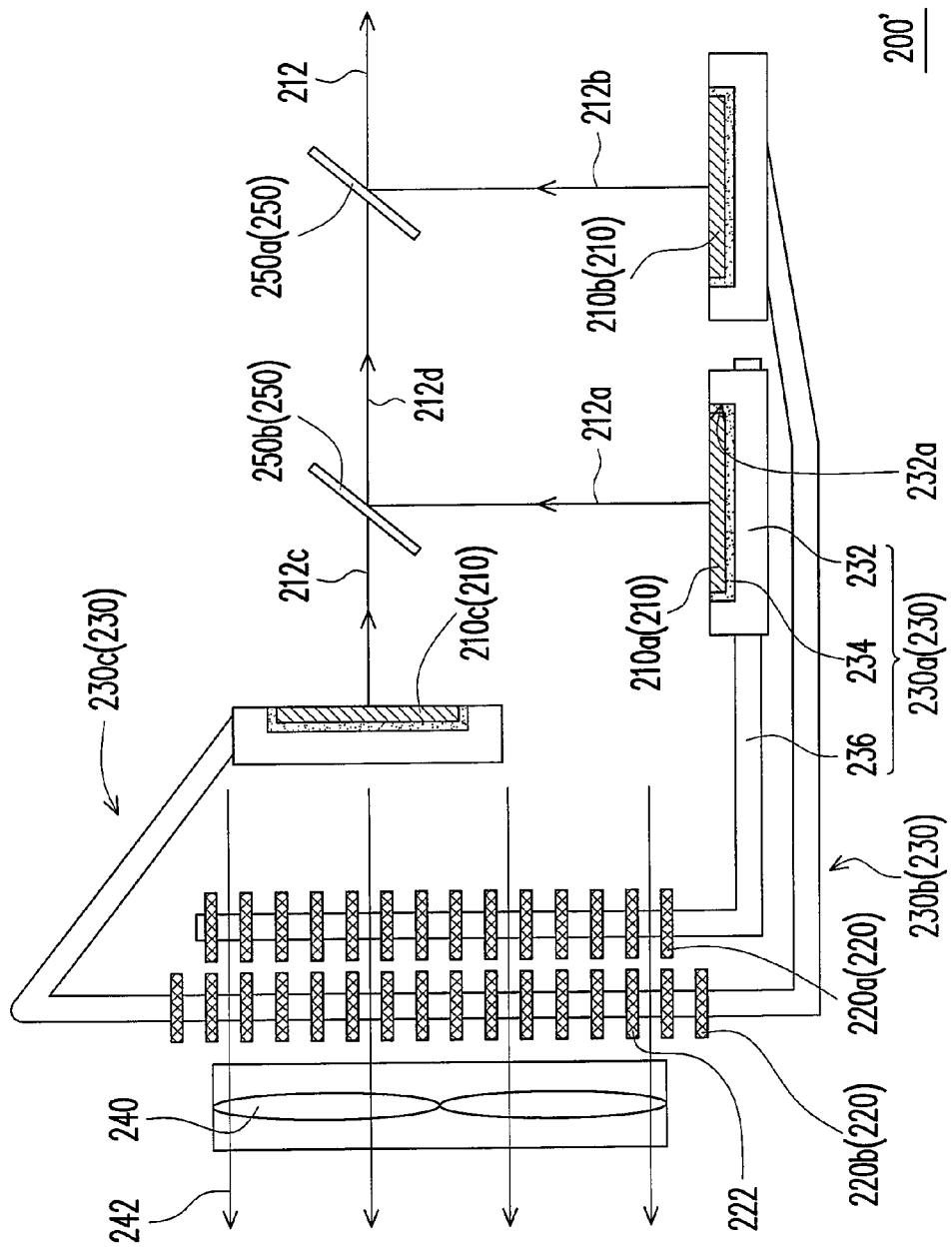
FIG. 4A is a schematic structural view of an illumination module according to still another embodiment of the present invention.

Referring to FIG. 4A, an illumination module 200' of this embodiment is similar to the illumination module 200 (referring to FIG. 2A), except that the illumination module 200' dose not have the third heat dissipation element, and the second heat dissipation element 220b is connected to the second heat conducting unit 230b and the third heat conducting unit 230c at the same time. Additionally, the first heat conducting unit 230a and the third heat conducting unit 230c are disposed separately, and the first heat conducting unit 230a and the second heat conducting unit 230b are disposed separately. That is to say, the illumination module 200' has two light-emitting assemblies disposed separately, in which a light-emitting assembly has the first light-emitting element 210a, the first heat conducting unit 230a, and the first heat dissipation element 220a, and another light-emitting assembly has the second light-emitting element 210b, the third light-emitting element 210c, the second heat conducting unit 230b, the third heat conducting unit 230c, and the second heat dissipation element 220b.

In this embodiment, the first light-emitting element 210a is designed to be the light-emitting element sensitive to temperature, for example, the red LED. The first color light beam 212a emitted by the first light-emitting element 210a is, for example, a red light beam. In addition, the second light-emitting element 210b and the third light-emitting element 210c can be designed to be the light-emitting elements less sensitive to temperature, for example, the blue LED and the green LEDs. In this way, by using the same heat dissipation element 220 (i.e., the second heat dissipation element 220b) disposed at the downstream of the air flow 242, the second light-emitting element 210b and the third light-emitting element 210c which are less sensitive to temperature work at a normal working temperature.

Figure 4B:
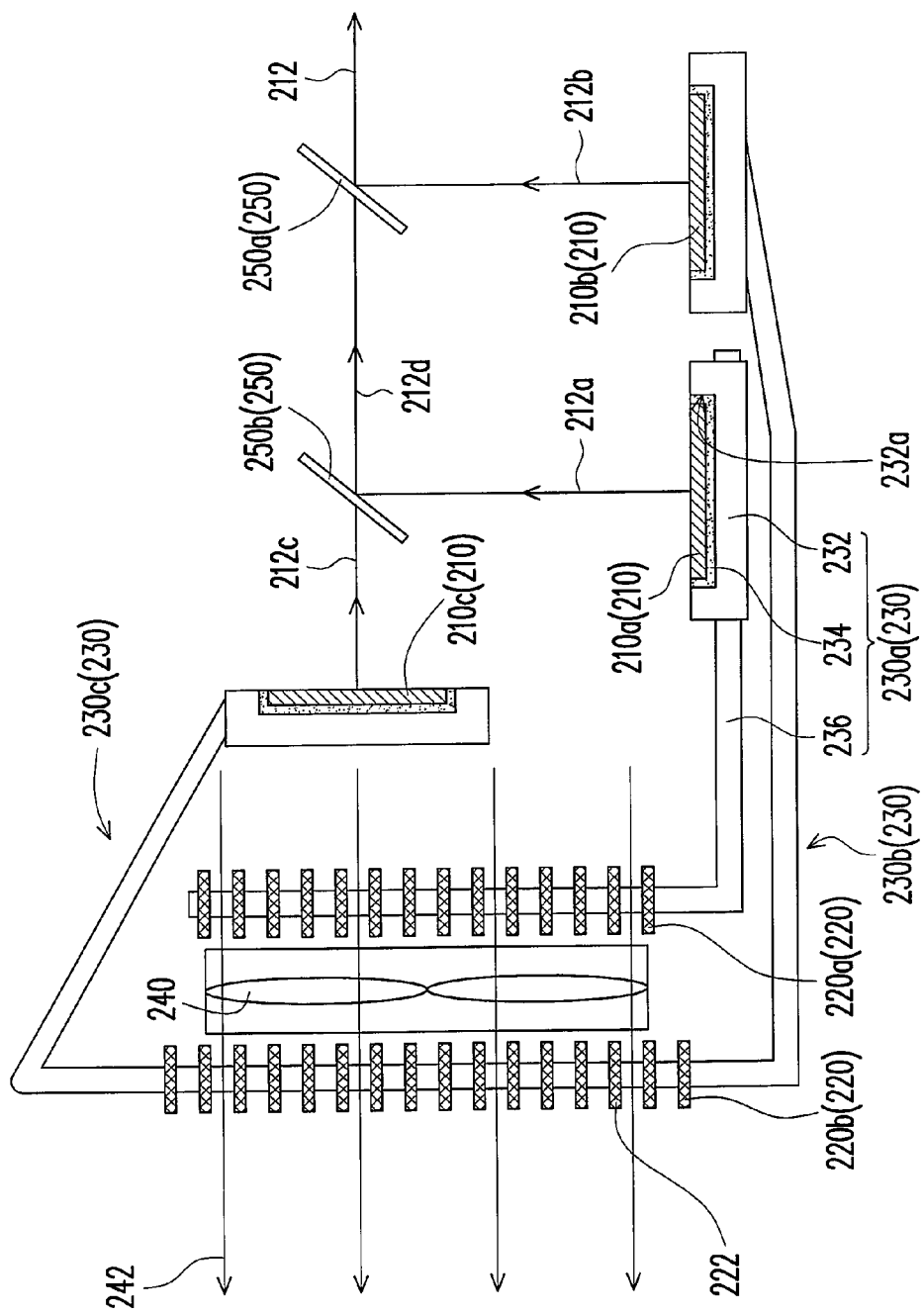
FIGS. 4B and 4C show other arrangement positions of the fan in FIG. 4A.
Figure 4C:
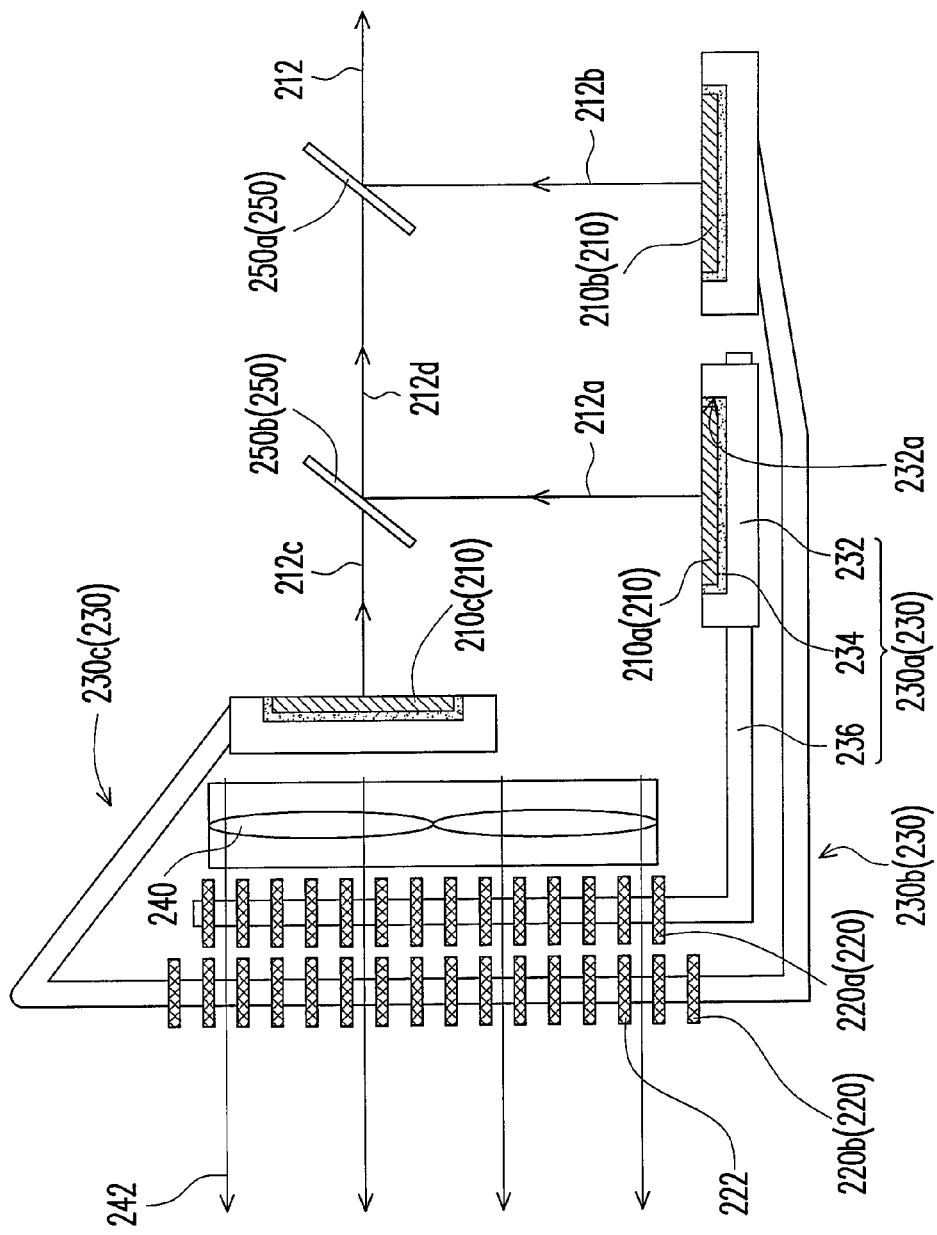

In this embodiment, the second heat dissipation element 220b is disposed between the fan 240 and the first heat dissipation element 220a. However, in other embodiments, the fan 240 is disposed between the second heat dissipation element 220b and the first heat dissipation element 220a (as shown in FIG. 4B). Or, the first heat dissipation element 220a is disposed between the second heat dissipation element 220b and the fan 240 (as shown in FIG. 4C).

Figure 5:
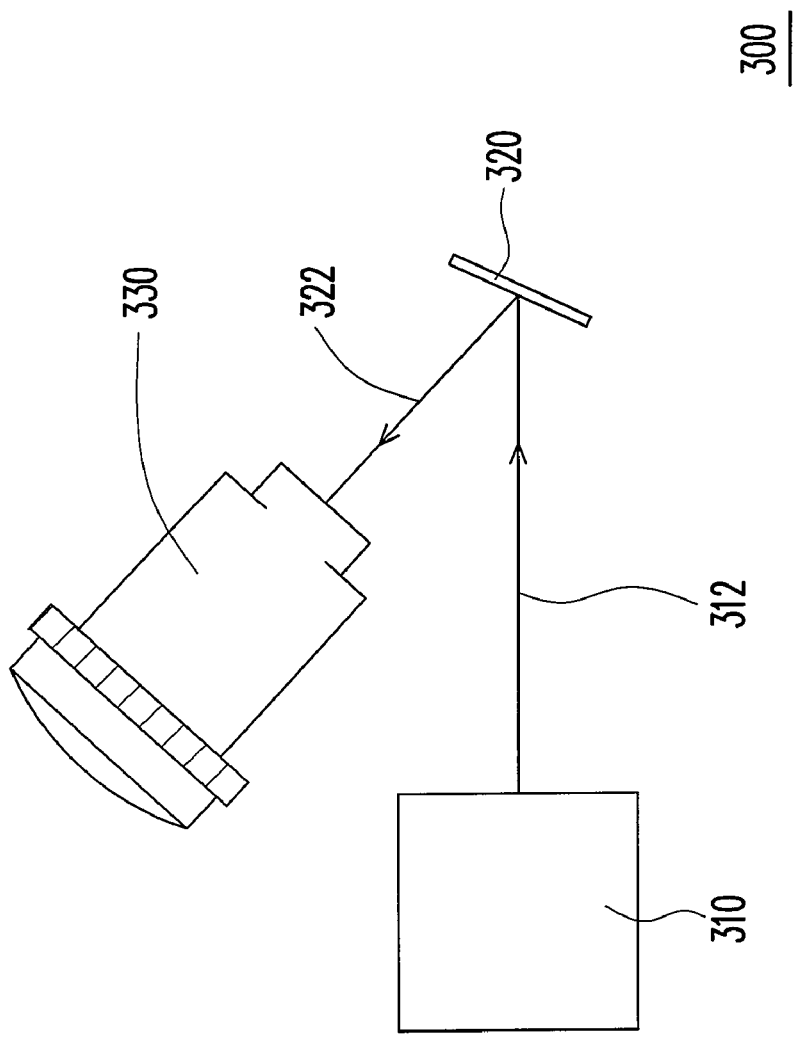
FIG. 5 is a schematic structural view of a projection apparatus according to an embodiment of the present invention.

Referring to FIG. 5, the projection apparatus 300 of this embodiment includes an illumination module 310, a light valve 320, and a projection lens 330. The illumination module 310 is, for example, the illumination module in any one of the above embodiments, and is capable of providing an illumination beam 312. The illumination beam 312 is, for example, the illumination beam 212 in any one of the above embodiments (as shown in FIG. 2A or FIG. 4A). The light valve 320 is disposed on a transmission path of the illumination beam 312, and is capable of converting the illumination beam 312 into an image beam 322. The light valve 320 is, for example, a digital micro-mirror element (DMD) or a liquid crystal on silicon panel, LCOS panel. The projection lens 330 is disposed on a transmission path of the image beam 322 to project the image beam 322 onto a screen. Since the illumination module 310 provides an illumination source with good quality and simple structure, the projection apparatus 300 of this embodiment has a good display quality and a smaller overall volume.

In view of the above, in the illumination module of the present invention, the first light-emitting element and other light-emitting elements are connected to different heat dissipation elements which are disposed separately through the heat conducting unit, and the air flow passes through the heat dissipation elements sequentially. In this way, the first light-emitting element is designed to be a light-emitting element sensitive to temperature, which is connected to the first heat dissipation element disposed at the upstream of the air flow through the heat conducting unit, and other light-emitting elements are designed to be light-emitting elements less sensitive to temperature, which are connected the heat dissipation element disposed at the downstream through the heat conducting unit. Accordingly, in the illumination module of the present invention, the heat generated by the light-emitting element sensitive to temperature is dissipated rapidly, so that the luminous efficiency and color of all the light-emitting elements are controlled within a normal range, and thus the illumination module of the present invention provides an illumination source with good quality, so as to improve the display quality of the projection apparatus using the illumination module.

Additionally, by using the above heat dissipation design, the illumination module of the present invention merely needs one fan to achieve good heat dissipation effect, so the illumination module of the present invention has a simplified structure. In this manner, the overall volume of the illumination module is reduced and the assembly procedure of the illumination module is simplified, thus the projection apparatus using the illumination module has a small volume and high mass productivity.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination module, comprising:
   a first light-emitting element, capable of emitting a first color light beam;
   a first heat dissipation element;
   a first heat conducting unit, connected between the first light-emitting element and the first heat dissipation element;
   a second light-emitting element, capable of emitting a second color light beam;
   a second heat dissipation element;
   a second heat conducting unit, connected between the second light-emitting element and the second heat dissipation element, wherein the first heat dissipation element and the second heat dissipation element are disposed separately, and the first heat conducting unit and the second heat conducting unit are disposed separately; and
   a fan for generating an air flow, wherein when the fan generates the air flow, the air flow passes through the first heat dissipation element and the second heat dissipation element in sequence.

2. The illumination module as claimed in claim 1, further comprising:
   a third light-emitting element, capable of emitting a third color light beam;
   a third heat dissipation element; and
   a third heat conducting unit, connected between the third light-emitting element and the third heat dissipation element, wherein the first heat dissipation element, the second heat dissipation element, and the third heat dissipation element are disposed separately, and the first heat conducting unit, the second heat conducting unit, and the third heat conducting unit are disposed separately, and wherein when the fan generates the air flow, the air flow passes through the first heat dissipation element, the second heat dissipation element, and the third heat dissipation element in sequence.

3. The illumination module as claimed in claim 2, wherein the first color light beam is a red light beam, the second color light beam is one of a green light beam and a blue light beam, and the third color light beam is the other one of the green light beam and the blue light beam.

4. The illumination module as claimed in claim 1, further comprising:
   a third light-emitting element, capable of emitting a third color light beam; and
   a third heat conducting unit, connected between the third light-emitting element and the second heat dissipation element, wherein the first heat conducting unit and the third heat conducting unit are disposed separately.

5. The illumination module as claimed in claim 4, wherein the first color light beam is a red light beam, the second color light beam is one of a green light beam and a blue light beam, and the third color light beam is the other one of the green light beam and the blue light beam.

6. The illumination module as claimed in claim 1, wherein each the light-emitting element is a light-emitting diode.

7. The illumination module as claimed in claim 1, wherein each the heat dissipation element comprises a plurality of heat sinks.

8. The illumination module as claimed in claim 1, wherein each the heat conducting unit comprises:
   a heat conducting block
   a thermal adhesive, connected between the light-emitting element and the heat conducting block corresponding to the thermal adhesive; and
   a heat pipe, having two ends respectively connected to the heat dissipation element and the heat conducting block corresponding to the heat pipe.

9. The illumination module as claimed in claim 8, wherein each the heat conducting block has an accommodation recess to accommodate the light-emitting element corresponding to heat conducting block.

10. The illumination module as claimed in claim 1, further comprising a dichroic mirror disposed on a transmission path of the first color light beam and the second color light beam for mixing the first color light beam and the second color light beam.

11. A projection apparatus, comprising:
    an illumination module, capable of providing an illumination beam, comprising:
      a first light-emitting element, capable of emitting a first color light beam;
      a first heat dissipation element;
      a first heat conducting unit, connected between the first light-emitting element and the first heat dissipation element;
      a second light-emitting element, capable of emitting a second color light beam;
      second heat dissipation element;
      a second heat conducting unit, connected between the second light-emitting element and the second heat dissipation element, wherein the first heat dissipation element and the second heat dissipation element are disposed separately, and the first heat conducting unit and the second heat conducting unit disposed separately; and
      a fan for generating an air flow, wherein when the fan generates the air flow, the air flow passes through the first heat dissipation element and the second heat dissipation element in sequence;

a light valve, disposed on a transmission path of the illumination beam, capable of converting the illumination beam into an image beam; and a projection lens, disposed on a transmission path of the image beam.

12. The projection apparatus as claimed in claim 11, wherein the illumination module further comprises:

a third light-emitting element, capable of emitting a third color light beam;

a third heat dissipation element; and a third heat conducting unit, connected between the third light-emitting element and the third heat dissipation element, wherein the first heat dissipation element, the second heat dissipation element, and the third heat dissipation element are disposed separately, and the first heat conducting unit, the second heat conducting unit, and the third heat conducting unit are disposed separately, and wherein when the fan generates the air flow, the air flow passes through the first heat dissipation element, the second heat dissipation element, and the third heat dissipation element in sequence.

13. The projection apparatus as claimed in claim 12, wherein the first color light beam is a red light beam, the second color light beam is one of a green light beam and a blue light beam, and the third color light beam is the other one of the green light beam and the blue light beam.

14. The projection apparatus as claimed in claim 11, wherein the illumination module further comprises:

a third light-emitting element, capable of emitting the third color light beam; and a third heat conducting unit, connected between the third light-emitting element and the second heat dissipation element, wherein the first heat conducting unit and the third heat conducting unit are disposed separately.

15. The projection apparatus as claimed in claim 14, wherein the first color light beam is a red light beam, the second color light beam is one of a green light beam and a blue light beam, and the third color light beam is the other one of the green light beam and the blue light beam.

16. The projection apparatus as claimed in claim 11, wherein each the light-emitting element is a light-emitting diode.

17. The projection apparatus as claimed in claim 11, wherein each the heat dissipation element comprises a plurality of heat sinks.

18. The projection apparatus as claimed in claim 11, wherein each the heat conducting unit comprises:

a heat conducting block;

a thermal adhesive, connected between the light-emitting element and the heat conducting block corresponding to the thermal adhesive; and a heat pipe, having two ends respectively connected to the heat dissipation element and the heat conducting block corresponding to the heat pipe.

19. The projection apparatus as claimed in claim 18, wherein each the heat conducting block has an accommodation recess to accommodate the light-emitting element corresponding to the heat conducting block.

20. The projection apparatus as claimed in claim 11, wherein the illumination module further comprises a dichroic mirror disposed on the transmission path of the first color light beam and the second color light beam for mixing the first color light beam and the second color light beam.

* * * * *